US011580193B2

(12) United States Patent
Ohno

(10) Patent No.: US 11,580,193 B2
(45) Date of Patent: Feb. 14, 2023

(54) COMPUTATION DEVICE, COMPUTATION METHOD, AND PROGRAM

(71) Applicant: NEC Corporation, Tokyo (JP)

(72) Inventor: Yoshiyuki Ohno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 152 days.

(21) Appl. No.: 16/623,842

(22) PCT Filed: Mar. 16, 2018

(86) PCT No.: PCT/JP2018/010640
§ 371 (c)(1),
(2) Date: Dec. 18, 2019

(87) PCT Pub. No.: WO2018/235357
PCT Pub. Date: Dec. 27, 2018

(65) Prior Publication Data
US 2020/0117701 A1  Apr. 16, 2020

(30) Foreign Application Priority Data

Jun. 22, 2017 (JP) .............................. JP2017-122481

(51) Int. Cl.
*G06F 17/16* (2006.01)
*G06F 7/00* (2006.01)

(52) U.S. Cl.
CPC ................ *G06F 17/16* (2013.01); *G06F 7/00* (2013.01)

(58) Field of Classification Search
CPC ........ G06F 17/16; G06F 7/5443; G06F 17/15; G06F 7/00; G06F 7/06; G06F 7/10; G06F 7/12
See application file for complete search history.

(56) References Cited

U.S. PATENT DOCUMENTS 9,600,763 B1  3/2017 Kasagi
2015/0371359 A1  12/2015 Wu et al.
(Continued)

FOREIGN PATENT DOCUMENTS

JP  H06-197222 A  7/1994
JP  2006-067521 A  3/2006
(Continued)

OTHER PUBLICATIONS

Hennessy, John L. et al. Computer Architecture : A Quantitative Approach, Elsevier Science & Technology, 2014, section 2.12 p. 132-133 figure 2.28 (Year: 2014).*
(Continued)

*Primary Examiner* — Emily E Larocque
*Assistant Examiner* — Huy Duong

(57) ABSTRACT

A computation device includes: a list generation unit that generates a list indicating element values of first elements comprised in a plurality of computational matrices having equal numbers of rows and columns, the element values being indicated for the respective positions of the first elements in the computational matrices; and a computation execution unit that carries out computation based on the element values of the first elements indicated in the list and the element values of second elements comprised in a partial matrix belonging to a computation target matrix and having the same number of rows and columns as the computational matrices.

3 Claims, 12 Drawing Sheets

(56) References Cited

U.S. PATENT DOCUMENTS

2017/0344876 A1* 11/2017 Brothers ................. G06N 3/04
2018/0046900 A1*  2/2018 Dally ................. G06F 9/30018
2018/0137414 A1*  5/2018 Du ....................... G06F 1/3243

FOREIGN PATENT DOCUMENTS

| JP | 2014-119949 A  | 6/2014 |
| JP | 2015-095259 A  | 5/2015 |
| JP | 2016-004572 A  | 1/2016 |
| JP | 2017-078934 A  | 4/2017 |
| WO | 2012/073575 A1 | 6/2012 |

OTHER PUBLICATIONS

Japanese Office Action for JP Application No. 2019-525092 dated Oct. 27, 2020 with English Translation.
International Search Report for PCT Application No. PCT/JP2018/010640 dated May 1, 2018.
Japanese Office Action for JP Application No. 2019-525092 dated Jun. 1, 2021 with English Translation.
Japanese Office Communication for JP Application No. 2019-525092 dated Jan. 4, 2022 with English Translation.

* cited by examiner

FIG. 6

| A11 | A12 |
|---|---|
| (0, 0) : | (1, 1), (2, 1) |
| (0, 1) : | (2, 2) |
| (0, 2) : | (0, 2), (2, 3) |
| (1, 1) : | (0, 1), (1, 2) |
| (2, 0) : | (0, 2), (3, 2) |
| (2, 1) : | (3, 4) |
| (2, 2) : | (1, 1), (3, 3) |

COMPUTATION DEVICE, COMPUTATION METHOD, AND PROGRAM

This application is a National Stage Entry of PCT/JP2018/010640 filed on Mar. 16, 2018, which claims priority from Japanese Patent Application 2017-122481 filed on Jun. 22, 2017, the contents of all of which are incorporated herein by reference, in their entirety.

TECHNICAL FIELD

The present invention relates to a computation device, a computation method, and a program.

BACKGROUND ART

Several techniques have been proposed for increasing the speed of processing which uses computation of two-dimensional convolution matrices such as a convolutional neural network.

For example, Patent Document 1 discloses a technique for reducing the amount of computation of a convolutional neural network in which average pooling is performed. In the technique described in Patent Document 1, based on obtaining the average of an output of a convolution layer in average pooling, for each element of the kernel, the sum of input values multiplied by each element is calculated, the product of the calculated sum and the kernel element is calculated, and the average of the products is calculated.

CITATION LIST

Patent Literature

[Patent Document 1] Japanese Unexamined Patent Application, First Publication No. 2017-078934

SUMMARY OF THE INVENTION

Problems to be Solved by the Invention

When a computer performs a matrix computation such as a two-dimensional convolution matrix computation, the amount of time required for the computation includes not only the amount of time for the CPU to perform calculation (calculation time) but also the amount of time for the CPU to access the memory to obtain computation target data (memory access time). In order to speed up the matrix computation, it is preferable not only to reduce the calculation time by reducing the number of computations, but also to reduce the memory access time by reducing the number of memory accesses.

An object of the present invention is to provide a computation device, a computation method, and a program capable of solving the above problems.

Means for Solving the Problems

According to a first aspect of the present invention, a computation device includes: a list generation unit configured to generate a list indicating element values of first elements comprised in a plurality of computational matrices having equal numbers of rows and columns, the element values being indicated for the respective positions of the first elements in the computational matrices; and a computation execution unit configured to carry out computation based on the element values of the first elements indicated in the list and the element values of second elements comprised in a partial matrix belonging to a computation target matrix and having the same number of rows and columns as the computational matrices.

According to a second aspect of the present invention, a computation device includes: a list generation unit configured to generate a list indicating element values other than zero of first elements comprised in a plurality of computational matrices having equal numbers of rows and columns, the element values being indicated for the positions of the first elements in the computational matrices; and a computation execution unit configured to carry out computation based on the element values of the first elements indicated in the list and the element values of second elements comprised in a partial matrix belonging to a computation target matrix and having the same number of rows and columns as the computational matrices.

According to a third aspect of the present invention, a computation method includes: generating a list indicating element values of first elements comprised in a plurality of computational matrices having equal numbers of rows and columns, the element values being indicated for the respective positions of the first elements in the computational matrices; and carrying out computation based on the element values of the first elements indicated in the list and the element values of second elements comprised in a partial matrix belonging to a computation target matrix and having the same number of rows and columns as the computational matrices.

According to a fourth aspect of the present invention, a program causes a computer to execute processes of: generating a list indicating element values of first elements comprised in a plurality of computational matrices having equal numbers of rows and columns, the element values being indicated for the respective positions of the first elements in the computational matrices; and carrying out computation based on the element values of the first elements indicated in the list and the element values of second elements comprised in a partial matrix belonging to a computation target matrix and having the same number of rows and columns as the computational matrices.

Advantageous Effects of Invention

According to the present invention, it is possible to reduce the number of memory accesses in a matrix computation such as a two-dimensional convolution matrix computation.

BRIEF DESCRIPTION OF DRAWINGS

FIG. 6 is a diagram showing an example of an element list generated by the list generation unit according to the exemplary embodiment.

DESCRIPTION OF EMBODIMENTS

Hereinafter, an exemplary embodiment of the present invention is described, however, the present invention within the scope of the claims is not limited by the following exemplary embodiment. Furthermore, not all the combinations of features described in the exemplary embodiment are essential for the solving means of the invention.

Figure 1:
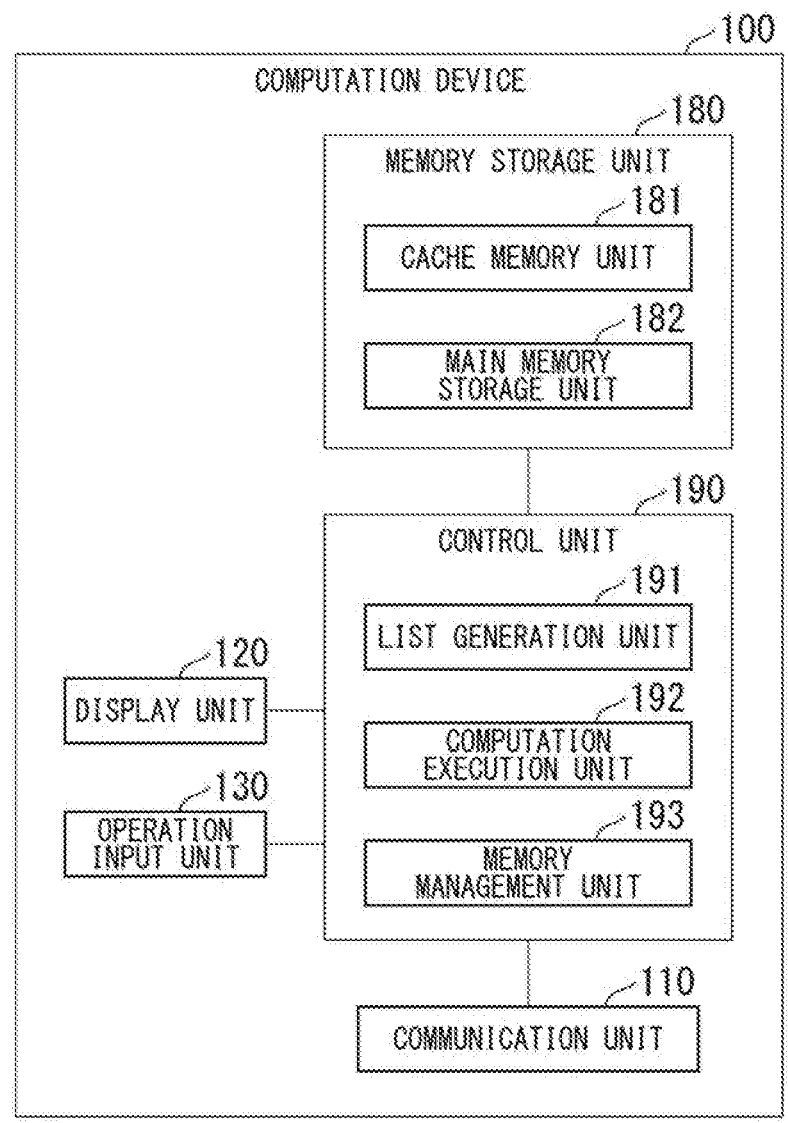
FIG. 1 is a schematic block diagram showing a functional configuration of a computation device according to an exemplary embodiment.

FIG. 1 is a schematic block diagram showing a functional configuration of a computation device according to an exemplary embodiment. As shown in FIG. 1, a computation device 100 includes; a communication unit 110, a display unit 120, an operation input unit 130, a memory storage unit 180, and a control unit 190. The memory storage unit 180 includes a cache memory unit 181 and a main memory storage unit 182. The control unit 190 includes a list generation unit 191, a computation execution unit 192, and a memory management unit 193.

The computation device 100 performs matrix computation. Hereinafter, a case will be described as an example where the computation device 100 performs a computation of a two-dimensional convolution matrix (convolution matrix), that is, a two-dimensional convolution. Two-dimensional convolution is used for various applications such as convolutional neural networks and image filters.

However, the matrix computation performed by the computation device 100 is not limited to two-dimensional convolution. The matrix computation performed by the computation device 100 may be various types of computation in which a part of the computation can be omitted when the element value takes "0".

The computation device 100 is configured using a computer such as a mainframe computer, a workstation computer, or a personal computer (PC).

In the following description, "*" (asterisk) is used as a convolution operator. Further, "x" (cross) is used as a scalar product operator.

The communication unit 110 communicates with other devices according to the control of the control unit 190. For example, the communication unit 110 may receive an input matrix in two-dimensional convolution from another device.

The display unit 120 includes a display screen such as a liquid crystal panel or an LED (light emitting diode) panel, and displays various types of images according to the control of the control unit 190. For example, when the computation device 100 performs image processing using two-dimensional convolution, the display unit 120 may display an image obtained by the image processing. Moreover, when the computation device 100 constitutes a convolutional neural network using two-dimensional convolution, the display unit 120 may display the processing result obtained by the convolutional neural network.

The operation input unit 130 includes input devices such as a keyboard and a mouse, and receives user operations. For example, the operation input unit 130 may receive a user operation which instructs the computation device 100 to execute processing.

The memory storage unit 180 stores various types of information. The memory storage unit 180 is configured according to a plurality of hierarchical layers, using several types of memory storage devices included in the computation device 100. Specifically, the computation device 100 is configured according to two hierarchical layers, that is, the cache memory unit 181 and the main memory storage unit 182. The cache memory unit 181 is configured using a cache memory device included in the computation device 100. The main memory storage unit 182 is configured using a main memory storage device included in the computation device 100.

The cache memory device is configured using a device that operates at a speed higher than that of the main memory storage device. The cache memory device is capable of reading and writing at a speed higher than that of the main memory storage device. The hierarchical layer of the main memory storage unit 182 corresponds to an example of the hierarchical layer of the main memory storage device, and the hierarchical layer of the cache memory unit 181 corresponds to an example of the hierarchical layer which is faster than the hierarchical layer of the main memory storage device. The hierarchical layer of the main memory storage device is also referred to as the hierarchical layer of the main memory storage unit 182. The hierarchical layer of the cache memory device is also referred to as the hierarchical layer of the cache memory unit 181.

The cache memory unit 181 is provided to reduce memory access time when a processing device such as a CPU (central processing unit) accesses the main memory storage device.

Data obtained by the computation device 100 are basically stored in the main memory storage unit 182, and data expected to be accessed by the CPU and so forth are temporarily stored in the cache memory unit 181.

For example, when the CPU and so forth access data not stored in the cache memory unit 181, the access target data are read from the main memory storage unit 182 and written to the cache memory unit 181 in units of blocks. Moreover, when data from the main memory storage unit 182 are moved to the cache memory unit 181, the data in the cache memory unit 181 are selected in block units in accordance with a predetermined replacement method such as LRU (least recently used) in order to secure a storage region for the data. The selected data are written to the main memory storage unit 182, and the memory storage region of the data in the cache memory unit 181 is released.

The cache memory unit 181 may hold a matrix which stores computation results (or may maintain the state of a matrix storing computation results) when the control unit 190 performs computation. For example, the cache memory unit 181 may hold a matrix which stores calculation results, until the control unit 190 starts and ends computation for a partial matrix described later.

When the control unit 190 repeatedly writes computation results, the cache memory unit 181 holds the writing target matrix. As a result, the memory access time can be reduced compared with the case where the control unit 190 writes the computation result in the main memory storage unit 182.

The hierarchical structure of the memory storage unit 180 is not limited to the two-layer structure with the cache memory unit 181 and the main memory storage unit 182 shown in FIG. 1. For example, the memory storage unit 180 may be configured according to a three-layer structure by using a primary cache memory device, a secondary cache memory device, and a main memory storage device. Moreover, the memory storage unit 180 may be configured to include a hierarchical layer at a speed lower than that of the main memory storage unit 182 such as an auxiliary memory storage unit, in addition to a hierarchical layer at a speed higher than that of the main memory storage unit 182.

The control unit 190 controls each unit of the computation device 100 and executes various processes. The control unit 190 is configured by a CPU included in the computation device 100 reading out a program from the memory storage unit 180 and executing the program.

The list generation unit 191 generates a list for the computation execution unit 192 to use for two-dimensional convolution. This list is also called an element list.

The computation execution unit 192 performs two-dimensional convolution using the element list generated by the list generation unit 191.

Here, two-dimensional convolution and the element list will be described with reference to FIG. 2 to FIG. 6.

Figure 2:
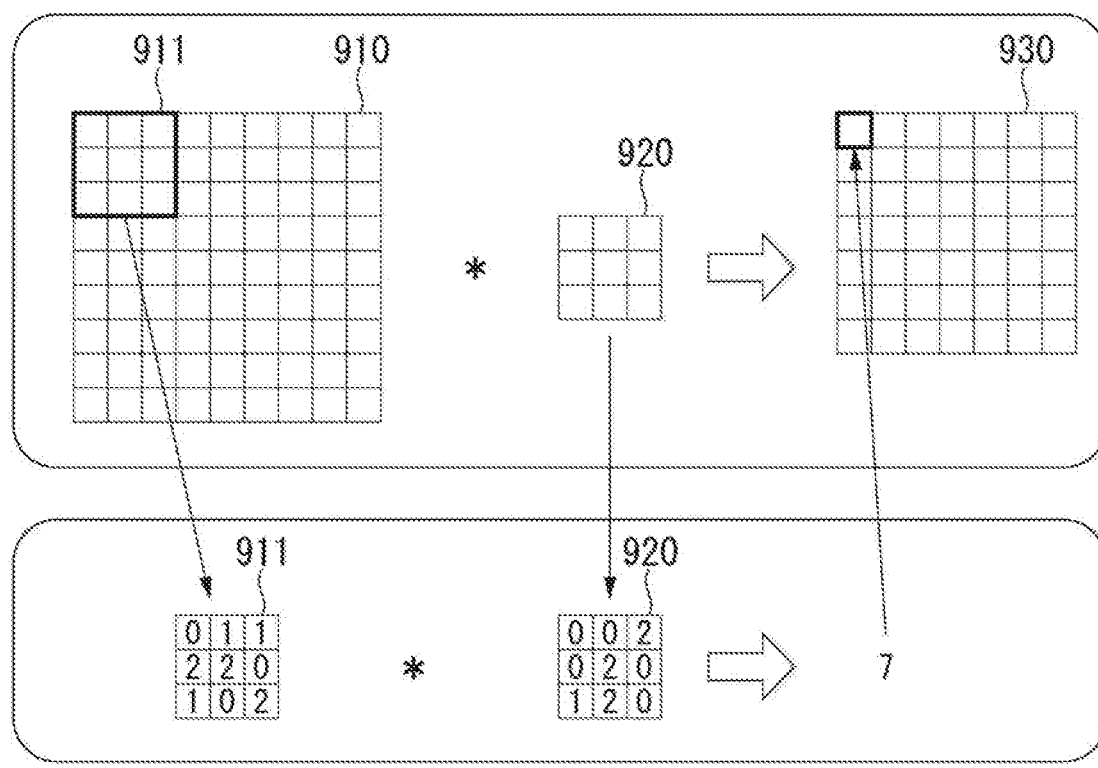
FIG. 2 is a diagram showing a configuration example of a matrix used by a list generation unit according to the exemplary embodiment for two-dimensional convolution.

FIG. 2 is a diagram showing a configuration example of a matrix used by the computation execution unit 192 for two-dimensional convolution.

The computation execution unit 192 performs convolution of an input matrix 910 and a kernel 920 and writes the computation result in an output matrix 930.

In the input matrix 910, convolution is performed between the kernel 920 and a partial matrix 911 having the same size as the kernel 920 among the input matrix 910, to calculate the value of one element of the output matrix 930. Here, having the same matrix size means that both the number of rows and the number of columns of the matrix are the same.

The input matrix 910 corresponds to an example of a computation target matrix. The kernel 920 corresponds to an example of a computational matrix.

The convolution of the partial matrix 911 and the kernel 920 is performed by multiplying elements at the same position by each other and finding the sum of the obtained products.

In the case of the example in FIG. 2, the convolution of the partial matrix 911 and the kernel 920 is expressed as in Equation (1).

$$0 \times 0 + 1 \times 0 + 1 \times 2 + 2 \times 0 + 2 \times 2 + 0 \times 0 = 7 + 1 \times 1 + 0 \times 2 + 2 \times 0 \qquad (1)$$

For example, in the example of FIG. 2, the value of the element in the first row and the first column of the partial matrix 911 is "0". The value of the element in the first row and the first column of the kernel 920 is also "0". The product of these values is "0". Moreover, the value of the element in the first row and second column of the partial matrix 911 is "1". The value of the element in the first row and the second column of the kernel 920 is "0". The product of these values is "0". Further, the value of the element in the first row and third column of the partial matrix 911 is "1". The value of the element in the first row and the third column of the kernel 920 is "2". The product of these values is "2".

When multiplying the elements at the same positions in the partial matrix 911 and the kernel 920 by each other to find the sum of the obtained products, the sum is "7" in the example of FIG. 2. The computation execution unit 192 does not perform the convolution computation as exemplified in Equation (1) as it is, but uses the element list generated by the list generation unit 191 to reduce the number of calculations and the number of memory accesses.

The computation execution unit 192 writes the computation result of the convolution between the partial matrix 911 and the kernel 920 in the element corresponding to the position of the partial matrix 911 among the elements of the output matrix 930.

In the example of FIG. 2, the computation execution unit 192 is set to write the computation result to the element at the same position as the leftmost and uppermost element of the partial matrix 911 among the elements of the output matrix 930. The computation execution unit 192 writes the computation result "7" to the element in the first row and the first column of the output matrix 930.

Figure 3:
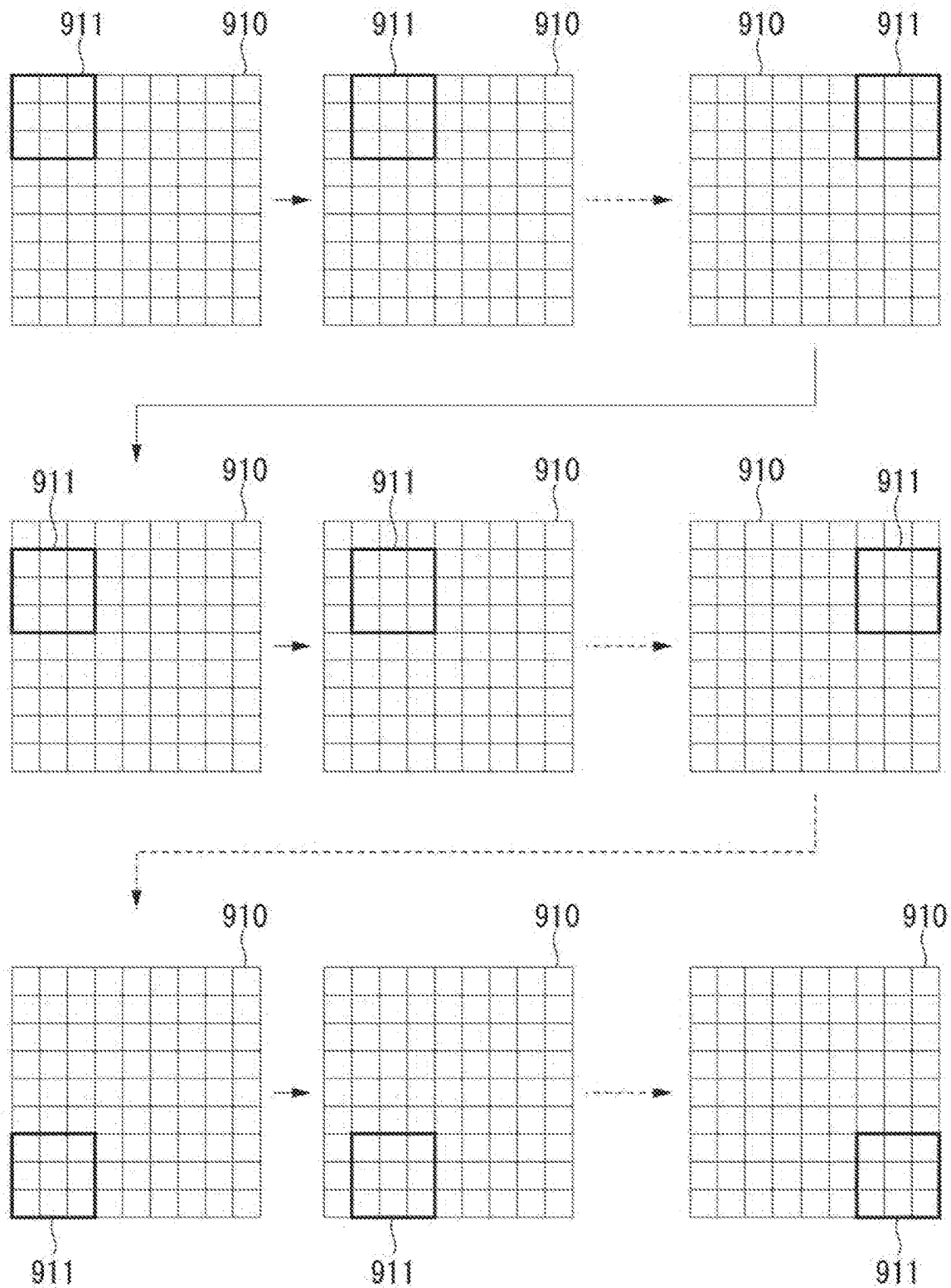
FIG. 3 is a diagram showing a configuration example of a partial matrix in the two-dimensional convolution according to the exemplary embodiment.

FIG. 3 is a diagram showing a setting example of the partial matrix 911 in the two-dimensional convolution.

In the example of FIG. 3, the computation execution unit 192 sets the partial matrix 911 of the input matrix 910 to the region shifted to the right by one column, and repeats the convolution as described with reference to FIG. 2. When the partial matrix 911 reaches the right end of the input matrix 910, the computation execution unit 192 shifts the region of the partial matrix 911 from the left end one row below to the right end, and repeats the convolution of the partial matrix 911 and the kernel 920. The computation execution unit 192 shifts the set region of the partial matrix 911 from left to right and downward, and repeats the setting of the partial matrix 911 until the set region reaches the lower right end. The computation execution unit 192 repeats the convolution of the partial matrix 911 and the kernel 920 every time the partial matrix 911 is set. Thereby, the computation execution unit 192 calculates the output matrix 930 corresponding to the entire input matrix 910.

Figure 4:
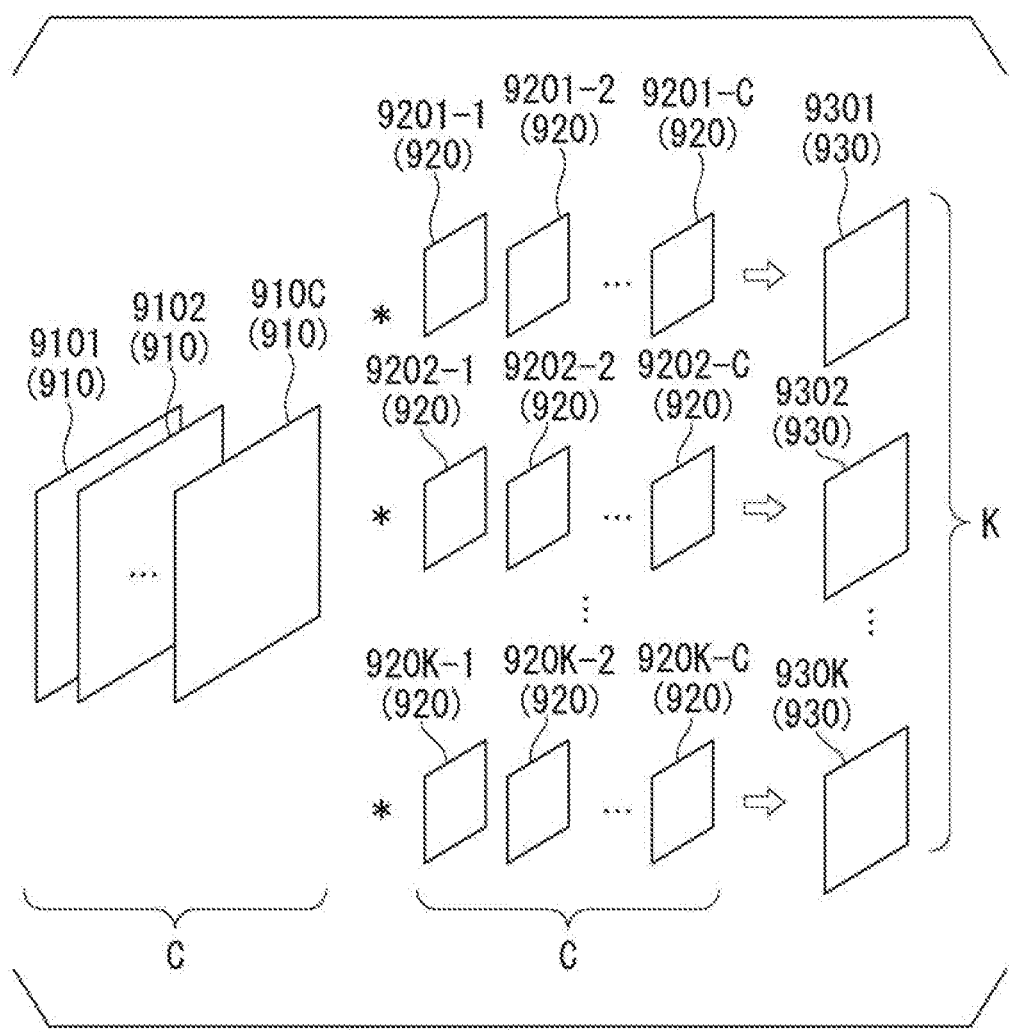
FIG. 4 is a diagram showing an example in which a computation execution unit according to the exemplary embodiment performs convolution using a plurality of input matrices and a plurality of kernels.

FIG. 4 is a diagram showing an example in which the computation execution unit 192 performs convolution using a plurality of input matrices 910 and a plurality of kernels 920.

In the example of FIG. 4, the computation execution unit 192 performs two-dimensional convolution using "C" input matrices 910 and "C×K" kernels 920, and writes the computation results in "K" output matrices 930. All of the "C" input matrices 910 are of the same size. All of the "C×K" kernels 920 are of the same size. All of the "K" output matrices 930 are of the same size.

In FIG. 4, the "C" input matrices 910 are denoted by reference numerals 9101, 9102, . . . , 910C to be differentiated from each other. Moreover, the "C×K" kernels 920 are denoted by reference numerals 9201-1, 9201-2, . . . , 9201-C, 9202-1, 9202-2, . . . , 9202-C, . . . , 920K-1, 920K-2, . . . , 920K-C to be differentiated from each other. In FIG. 4, the "K" output matrices 930 are denoted by reference numerals 9301, 9302, . . . , 930K to be differentiated from each other.

The computation execution unit 192 performs convolution of the input matrix 9101 and the kernel 9201-1, convolution of the input matrix 9102 and the kernel 9201-2, . . . , and convolution of the input matrix 910C and the kernel 9201-C, and calculates the output matrix 9301 by summing the computation results for each element position. The same applies to the calculation of the output matrices 9302 to 930K.

That is to say, when i is a positive integer where $1 \leq i \leq K$, the computation execution unit 192 performs convolution of the input matrix 9101 and the kernel 920$i$-1, convolution of the input matrix 9102 and the kernel 920$i$-2, . . . , and convolution of the input matrix 910C and the kernel 920$i$-C. The computation execution unit 192 calculates the output matrix 930$i$ by summing the computation results for each element position.

The computation execution unit 192 may use the same kernel 920 for a plurality of input matrices 910, or may use a different kernel 920 for each input matrix 910. For example, in FIG. 4, the kernels 9201-1 to 9201-C may be the same kernel 920.

As can be seen above, the computation execution unit 192 may perform convolution using a plurality of input matrices 910 and a plurality of kernels 920. In particular, the computation execution unit 192 performs convolution of one input matrix 910 and each of the plurality of kernels 920.

Figure 5:
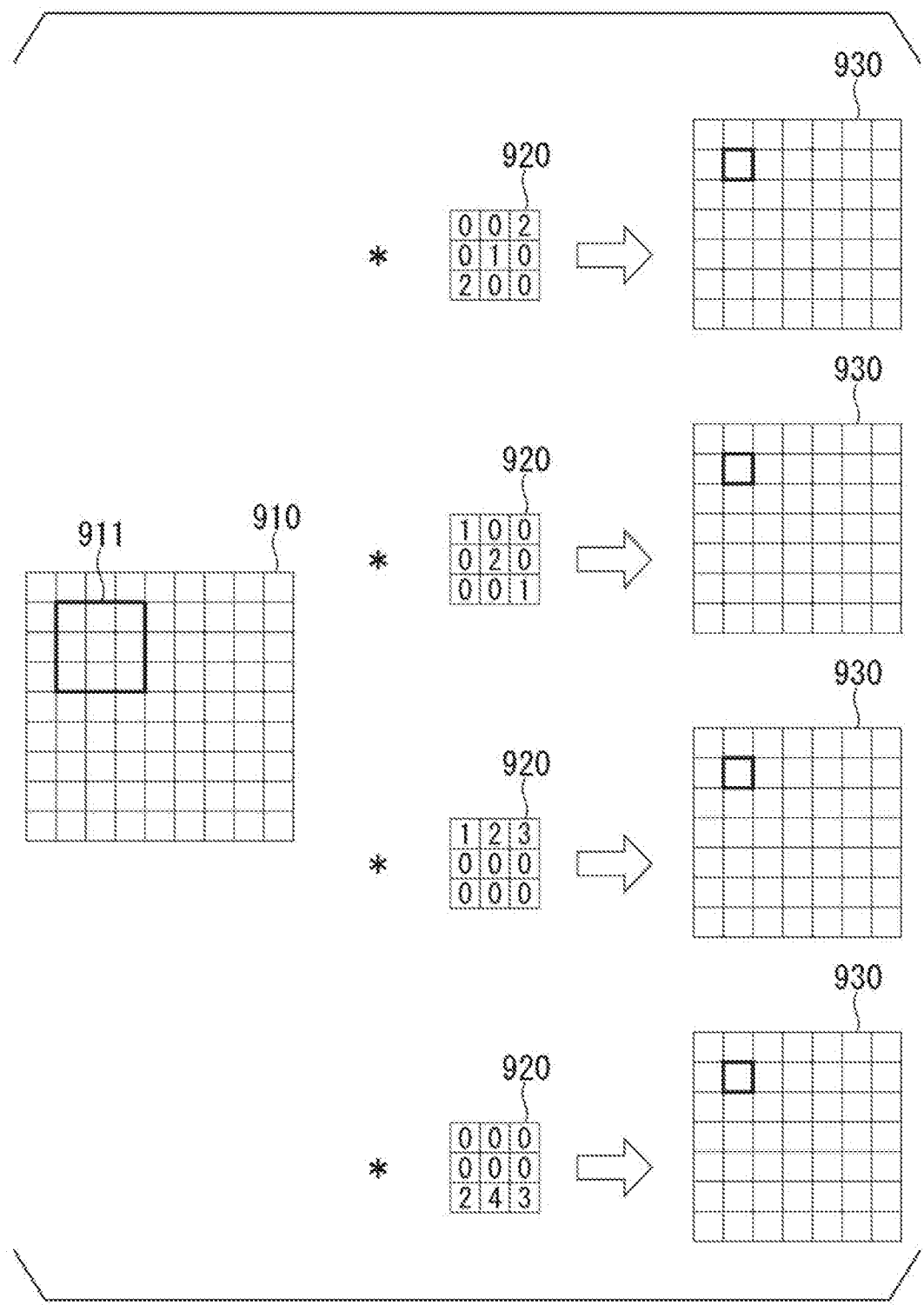
FIG. 5 is a diagram showing an example in which the computation execution unit according to the exemplary embodiment performs convolution of an input matrix and a plurality of kernels.

FIG. 5 is a diagram showing an example in which the computation execution unit 192 performs convolution of one input matrix 910 and each of the plurality of kernels 920. In the example of FIG. 5, the computation execution unit 192 performs convolution of one input matrix 910 and four kernels 920 to calculate four output matrices 930. As described with reference to FIG. 2 to FIG. 3, the computation execution unit 192 performs convolution of the partial matrix 911 and the kernel 920 while shifting the position of the region of the partial matrix 911 in the input matrix 910. As a result, the computation execution unit 192 performs convolution of one input matrix 910 and each of the kernels 920.

When the computation execution unit 192 performs convolution of one input matrix 910 and each of the plurality of kernels 920, the list generation unit 191 preliminarily generates an element list in order to speed up the process.

FIG. 6 is a diagram showing an example of an element list generated by the list generation unit 191. FIG. 6 shows an example of the element list generated by the list generation unit 191 for the kernels 920 in the example of FIG. 5.

In the example of FIG. 6, the four kernels 920 of FIG. 5 are denoted by identification numbers 0 to 3 in sequence from the top to be differentiated from each other. Moreover, in the example of FIG. 5, four kernels 920 and four output matrices 930 are respectively associated in a one-to-one manner, and the four output matrices 930 are also distinguished by identification numbers 0 to 3. The identification number of the kernel 920 is also referred to as a kernel ID (identifier).

In each row of the element list in FIG. 6, the position of each element in the kernel 920 is specified by a combination of rows 0 to 2 and columns 0 to 2 as shown in the region A11.

In the region A11, the positions of elements where element values of the kernels 920 are all "0" are excluded from being shown. For example, the element value in the first row and the 0-th column is "0" in all of the four kernels 920 in FIG. 5. Accordingly, in the region A11, "(1, 0)" representing the first row and the 0-th column is not shown.

In each row of the element list in FIG. 6, the element value at the specified element position is shown in the region A12 in combination with the identification number of the kernel 920. Elements where the element value is 0 are excluded from being shown in the region A12.

For example, the element value of the 0-th row and the 0-th column is "0" in the uppermost kernel 920 in FIG. 5 (the kernel 920 of the identification number 0). This element is not shown in the region A12.

On the other hand, the element value of the 0-th row and the 0-th column is "1" in the kernel 920 of the second from the top in FIG. 5 (the kernel 920 of the identification number 1). Accordingly, in the region A12 of the uppermost row of the element list in FIG. 6 (the row corresponding to the 0-th row and the 0-th column), "(1, 1)" which combines the identification number "1" of the kernel 920 and the element value "1" is shown.

Moreover, the element value of the 0-th row and the 0-th column is "1" in the kernel 920 of the third from the top in FIG. 5 (the kernel 920 of the identification number 2). Accordingly, in the region A12 of the uppermost row of the element list in FIG. 6 (the row corresponding to the 0-th row and the 0-th column), "(2, 1)" which combines the identification number "2" of the kernel 920 and the element value "1" is shown.

Moreover, the element value of the 0-th row and the 1-th column is "2" in the kernel 920 of the third from the top in FIG. 5 (the kernel 920 of the identification number 2). Accordingly, in the region A12 of the row of the second from the top of the element list in FIG. 6 (the row corresponding to the 0-th row and the 1-th column), "(2, 2)" which combines the identification number "2" of the kernel 920 and the element value "2" is shown.

In this way, the list generation unit 191 generates an element list showing element values for each element position of the plurality of kernels 920. Moreover, the list generation unit 191 generates an element list showing elements other than ones where the element value is "0", for each element position of the plurality of kernels 920.

The computation execution unit 192 performs convolution of the partial matrix 911 and the kernel 920, using the element list generated by the list generation unit 191. Specifically, the computation execution unit 192 multiplies the value of the element at the position shown in the region A11 among the elements of the partial matrices 911 by the element value shown in the element list. Moreover, the computation execution unit 192 adds the multiplication result (the obtained product) to the value of the corresponding element of the output matrix 930 identified by the identification number.

By performing convolution using the element list which shows the element value for each element position of the plurality of kernels 920, the computation execution unit 192 can perform multiplication of the elements of the partial matrix 911 and each element of the plurality of kernels 920. Thereby, multiplication with the elements of the plurality of kernels 920 can be performed with a single loading of the element values of the partial matrix 911, and the number of downloads of the element values of the partial matrix 911 can be reduced.

Moreover, the computation execution unit 192 uses the element list showing elements other than ones where the element value is 0, for each element position of the plurality of kernels 920. As a result, when the element value of the kernel 920 is 0, it is possible to suppress multiplication to be performed between the elements of the partial matrix 911 and the elements of the kernel 920, and to suppress accesses made in order to reflect the results of the multiplication in the output matrix 930. In this respect, the number of computations and the number of memory accesses can be reduced.

The memory management unit 193 performs management of the memory storage unit 180. Specifically, the memory management unit 193 reads or writes data from or to the cache memory unit 181 and/or the main memory storage unit 182.

In particular, the memory management unit 193 makes reference to the element list generated by the list generation unit 191 and loads, among the elements of the input matrix 910, elements where the element value of the computation subject for the element contains a value other than 0. On the other hand, the memory management unit 193 suppresses loading of, among the elements of the input matrix 910, elements where values of the computation subject elements for the elements are all 0.

That is to say, the memory management unit 193 loads, among the plurality of elements comprised in the input matrix 910, the element values of elements where each element of the computation target in the kernel 920 contains an element other value "0". Moreover, the memory management unit 193 suppresses loading of, among the plurality of elements comprised in the input matrix 910, the element values of elements where the respective elements of the computation target in the kernel 920 are all value "0".

Loading of, among the elements of the input matrix 910, elements where values of the computation subject elements for the elements are all 0 is suppressed. As a result, according to the computation device 100, the number of memory accesses can be reduced.

Moreover, the memory management unit 193 holds the output matrix 930 in the cache memory unit 181 until at least the computation execution unit 192 starts and ends performing computation for one of the partial matrices.

As a result, the memory management unit 193 can reduce the memory access time taken when the results computed by the computation execution unit 192 are reflected in the output matrix 930.

The function of the memory management unit 193 may be realized using a CPU, or may be configured using a device other than the CPU, such as a processor dedicated to memory accessing.

Next, the operation of the computation device 100 will be described with reference to FIG. 7 to FIG. 9.

Figure 7:
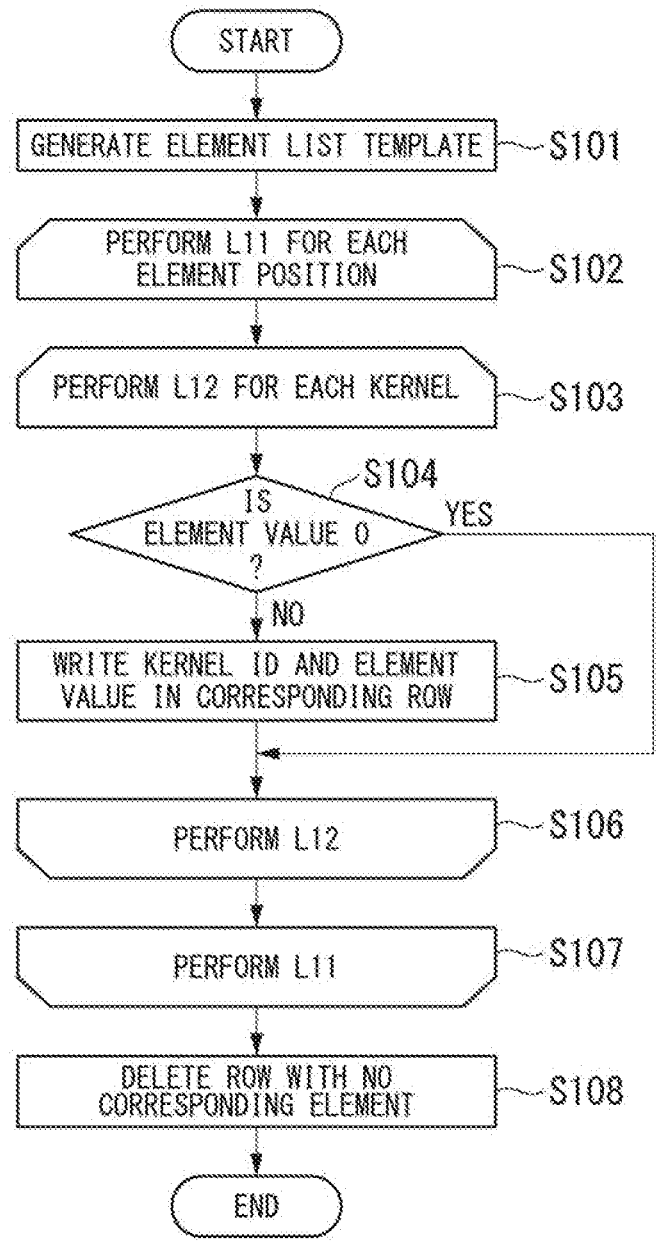
FIG. 7 is a flowchart showing an example of a processing procedure in which the list generation unit according to the exemplary embodiment generates the element list.

FIG. 7 is a flowchart showing an example of a processing procedure in which the list generation unit 191 generates the element list. The list generation unit 191 preliminarily performs the processing of FIG. 7, that is to say, for example, the processing of FIG. 7 is performed when the kernel 920 is given to the computation device 100.

(Step S101)

The list generation unit 191 generates a template of the element list.

After Step S101, the process proceeds to Step S102.

Figure 8:
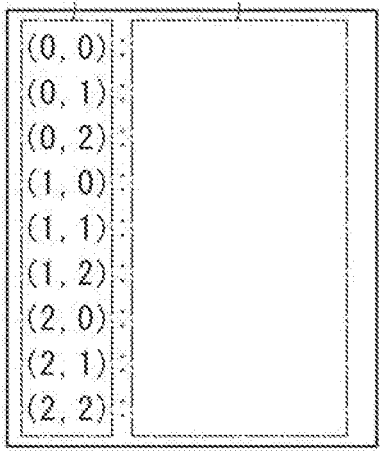
FIG. 8 is a diagram showing an example of a template of the element list according to the exemplary embodiment.

FIG. 8 is a diagram showing an example of the template of the element list. In the template shown in FIG. 8, one row corresponds to the position of one element of the kernel 920.

The region A21 shown in FIG. 8 corresponds to the region A11 of FIG. 6, and the position of the element is specified by a combination of a row and a column. In the example of FIG. 6, the row corresponding to the position of the element where element values of the kernel 920 are all "0" as in the first row and the 0-th column is deleted. On the other hand, on the stage of the template shown in FIG. 8, all combinations of rows and columns are shown.

The region A22 shown in FIG. 8 corresponds to the region A12 of FIG. 6, and is a region for storing combinations of the identification numbers of the kernels 920 and the element values.

(Step S102)

After Step S101 of FIG. 7, the list generation unit 191 starts a loop L11 which performs processing for each element position of the kernel 920 (that is to say, for each row and each column). The position of the processing target in the loop L11 is referred to as a target position.

After Step S102, the process proceeds to Step S103.

(Step S103)

The list generation unit 191 starts a loop L12 which performs processing for each kernel 920. The kernel 920 of the processing target in the loop L12 is referred to as a target kernel.

After Step S103, the process proceeds to Step S104.

(Step S104)

The list generation unit 191 determines whether or not the element value at the target position of the target kernel is a value "0".

If the element value is determined as a value "0" (Step S104: YES), the process proceeds to Step S106. On the other hand, if the element value is determined as not a value "0" (Step S104: NO), the process proceeds to Step S105.

(Step S105)

The list generation unit 191 writes the combination of the kernel ID of the target kernel and the element value of the target position of the target kernel in the region A22 of the row corresponding to the target position of the template of the element list. If the combination of a kernel ID and an element value has already been written in the corresponding row, the list generation unit 191 does not delete the already written combination, and adds a combination of the kernel ID of the target kernel and the element value of the target position of the target kernel.

After Step S105, the process proceeds to Step S106.

(Step S106)

The list generation unit 191 performs a termination process of the loop L12. Specifically, the list generation unit 191 determines whether or not the processing of the loop L12 has been performed for all of the kernels 920.

If it is determined that an unprocessed kernel 920 still remains, the list generation unit 191 returns to Step S103, and continues to perform the processing of the loop L12 for the remaining kernel 920. On the other hand, if it is determined that the processing of the loop L12 has been performed for all of the kernels 920, the list generation unit 191 ends the loop L12, and the process proceeds to Step S107.

(Step S107)

The list generation unit 191 performs a termination process of the loop L11. Specifically, the list generation unit 191 determines whether or not the processing of the loop L11 has been performed for all of the element positions in the kernel 920. If it is determined that an unprocessed position still remains, the list generation unit 191 returns to Step S102, and continues to perform the processing of the loop L11 for the remaining position. On the other hand, if it is determined that the processing of the loop L11 has been performed for all of the positions, the list generation unit 191 ends the loop L11, and the process proceeds to Step S108.

(Step S108)

The list generation unit 191 deletes a row in which no combination of the kernel ID and the element value is shown in the region A22, from the rows of the element list template. If several rows in which no combination of the kernel ID and the element value is shown are present in the region A22, the list generation unit 191 deletes all of these rows. As a result of this processing, the element list is completed.

After Step S108, the process of FIG. 7 ends.

Figure 9:
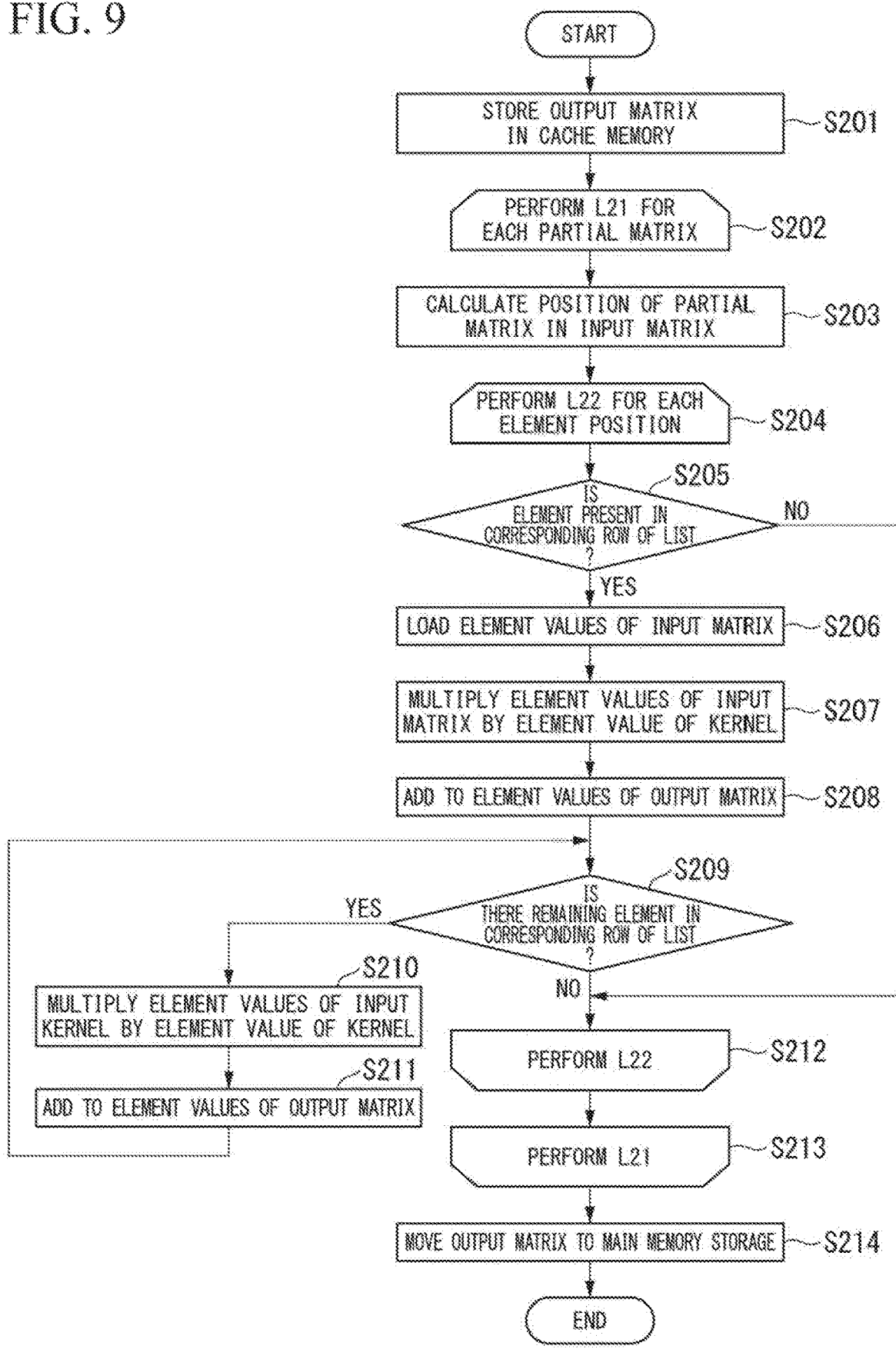
FIG. 9 is a flowchart showing an example of a processing procedure in which the computation device according to the exemplary embodiment performs convolution of the partial matrix of the input matrix and the kernel.

FIG. 9 is a flowchart showing an example of a processing procedure in which the computation device 100 performs convolution of the partial matrix 911 of the input matrix 910 and the kernel 920. For example, when the operation input unit 130 receives a user operation which instructs an execution of convolution, the computation device 100 performs the processing of FIG. 9.

FIG. 9 shows an example of processing for one input matrix 910. If several input matrices 910 are present, the computation device 100 repeats the processing of Step S202 to Step S213 in FIG. 9 as many times as the number of the input matrices 910.

(Step S201)

The memory management unit 193 stores the output matrix 930 in the cache memory unit 181. Specifically, the memory management unit 193 secures as many regions as the number of the output matrices 930 in the cache memory unit 181 and initializes the value of each element of each output matrix 930 to a value "0".

After Step S201, the process proceeds to Step S202.

(Step S202)

The control unit 190 starts a loop L21 which performs the processing for each partial matrix 911 as described with reference to FIG. 3. The partial matrix 911 of the processing target in the loop L21 is referred to as a target partial matrix.

After Step S202, the process proceeds to Step S203.

(Step S203)

The computation execution unit 192 calculates the position of the target partial matrix in the input matrix 910. For example, the computation execution unit 192 calculates the position, in the input matrix 910, of the leftmost and uppermost element in the partial matrix 911 (the element in the 0-th row and 0-th column).

After Step S203, the process proceeds to Step S204.

(Step S204)

The control unit 190 starts a loop L22 which performs processing for each element position of the target partial matrix. The position of the processing target in the loop L22 is referred to as a target position.

After Step S204, the process proceeds to Step S205.

(Step S205)

The computation execution unit 192 determines whether or not a combination of a kernel ID and an element value is shown in the row corresponding to the processing target position among the rows in the element list.

If it is determined that a combination of a kernel ID and an element value is shown (Step S205: YES), the process proceeds to Step S206. On the other hand, if it is determined that a combination of a kernel ID and an element value is not shown (Step S205: NO), the process proceeds to Step S212.

(Step S206)

The memory management unit 193 loads the element value of the processing target position of the partial matrix 911 of the input matrix 910.

After Step S206, the process proceeds to Step S207.

(Step S207)

The computation execution unit 192 calculates the product of the element value obtained in Step S206 and the element value of the kernel 920 shown in the corresponding row of the element list.

If several combinations of kernel IDs and element values are shown in the row of the element list, the computation execution unit 192 selects one combination which has not yet undergone the process of Step S207. Then, the computation execution unit 192 performs the process of Step S207 using the element values shown in the selected combination.

(Step S208)

The computation execution unit 192 adds the product obtained in Step S207 to the element value of the output matrix 930.

Specifically, the computation execution unit 192 calculates the element position of the output matrix 930 corresponding to this position on the basis of the position of the partial matrix 911 in the input matrix 910 calculated in Step S203. The memory management unit 193 accesses the cache memory unit 181, and reads the element value of the position calculated by the computation execution unit 192, among the element values of the output matrix 930 identified by the kernel ID selected from the element list in Step S207. The computation execution unit 192 adds the product obtained in Step S207 to the element value read by the memory management unit 193. The memory management unit 193 overwrites the element from which the value has been read with the sum calculated by the computation execution unit 192.

After Step S208, the process proceeds to Step S209.

(Step S209)

The computation execution unit 192 determines whether or not an unprocessed combination of a kernel ID and an element value still remains in the row corresponding to the processing target position among the rows in the element list.

If it is determined that an unprocessed combination of a kernel ID and an element value still remains (Step S209: YES), the computation execution unit 192 proceeds to Step S210. On the other hand, if it is determined that no unprocessed combination of a kernel ID and an element value remains (Step S209: NO), the computation execution unit 192 proceeds to Step S212.

(Step S210)

The computation execution unit 192 calculates the product of the element value of the combination which has been determined as not having been processed in Step S209 and the element value of the kernel 920 shown in the corresponding row of the element list.

If there are several combinations determined as unprocessed in Step S209, the computation execution unit 192 selects any one of the combinations. Then, the computation execution unit 192 performs the process of Step S210 using the element values shown in the selected combination.

After Step S210, the process proceeds to Step S211.

(Step S211)

The computation execution unit 192 adds the product obtained in Step S210 to the element value of the output matrix 930.

To describe specific processing here, the description of "Step S207" is replaced with "Step S210" in the specific processing described in Step S208.

After Step S211, the process returns to Step S209.

(Step S212)

The control unit 190 performs the termination process of the loop L22. Specifically, the control unit 190 determines whether or not the processing of the loop L22 has been performed for all of the element positions in the kernel 920. If it is determined that an unprocessed position still remains, the process returns to Step S204, and continues to perform the processing of the loop L22 for the remaining position. On the other hand, if it is determined that the processing of the loop L22 has been performed for all of the positions, the control unit 190 ends the loop L22, and the process proceeds to Step S213.

(Step S213)

The control unit 190 performs the termination process of the loop L21. Specifically, the control unit 190 determines whether or not the processing of the loop L21 has been performed for all of the partial matrices 911 serving as the processing target in the loop L21. If it is determined that an unprocessed partial matrix 911 still remains, the control unit 190 returns to Step S202, and continues to perform the processing of the loop L21 for the remaining partial matrix 911. On the other hand, if it is determined that the processing of the loop L21 has been performed for all of the partial matrices 911, the control unit 190 ends the loop L21, and the process proceeds to Step S214.

(Step S214)

The memory management unit 193 moves (swap outs) the output matrix 930 from the cache memory unit 181 to the main memory storage unit 182. Alternatively, the memory management unit 193 may not perform any particular processing on the stage of the Step S214, and may move the output matrix 930 from the cache memory unit 181 to the main memory storage unit 182 when the memory storage capacity of the cache memory unit 181 becomes insufficient.

After Step S214, the process of FIG. 9 ends.

As described above, the list generation unit 191 generates an element list showing the element value for each element position of the plurality of kernels 920 where the numbers of rows and columns are the same.

The computation execution unit 192 performs convolution between the element values of the partial matrix 911 having the same number of rows and columns as the kernel 920 in the input matrix 910 and the element values shown in the element list.

By performing convolution using the element list which shows the element value for each element position of the plurality of kernels 920, the computation execution unit 192 can perform multiplication of the elements of the partial matrix 911 and each element of the plurality of kernels 920. Thereby, multiplication with the elements of the plurality of kernels 920 can be performed with a single loading of the element values of the partial matrix 911, and the number of downloads of the element values of the partial matrix 911 can be reduced.

Moreover, the list generation unit 191 generates the element list showing elements other than ones where the element value is "0", for each element position of the kernel 920.

The computation execution unit 192 uses the element list showing elements other than ones where the element value is 0, for each element position of the plurality of kernels 920. As a result, it is possible to suppress multiplication to be performed between the elements of the partial matrix 911 and the elements of the kernel 920 when the element value of the kernel 920 is "0", and to suppress accesses made in order to reflect the results of the multiplication in the output matrix 930. In this respect, the number of computations and the number of memory accesses can be reduced.

In particular, the computation device 100 can reduce not only the number of calculations but also the number of memory accesses, so that the time required for the convolution computation can be further reduced.

Figure 10:
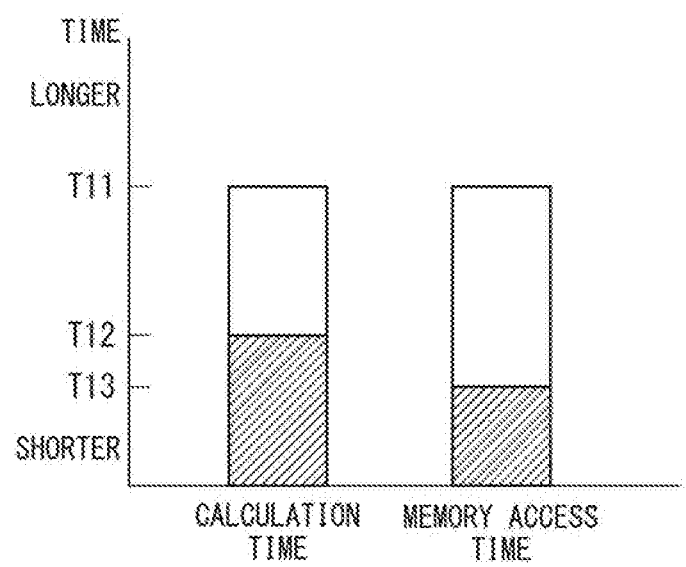
FIG. 10 is a graph showing an example of calculation time required for convolution and memory access time.

FIG. 10 is a graph showing an example of calculation time required for convolution and memory access time. The vertical axis in FIG. 10 represents time. The upper parts of the vertical axis represent longer times, and the lower parts represent shorter times.

FIG. 10 shows examples of a case where the calculation time and the memory access time are balanced with a single-core vector computer or the like and both take an amount of time T11, and a case where both the calculation time and the memory access time are reduced.

For example, in the case where only the calculation time is reduced by reducing the number of calculations from the state at time T11 for both the calculation time and the memory access time, the time reduction effect is limited in that the memory access time remains being time T11.

On the other hand, in the case where the calculation time is reduced to time T12 and the memory access time is reduced to time T13 as in the example of FIG. 10, both the calculation time and the memory access time are reduced. As a result, a greater time reduction effect is expected.

Moreover, the memory management unit 193 makes reference to the element list and loads, among the elements of the input matrix 910, elements where the element value of the computation subject for the element contains a value other than "0". On the other hand, the memory management unit 193 suppresses loading of, among the elements of the input matrix 910, elements where values of the computation subject elements for the elements are all "0".

Specifically, the computation execution unit 192 identifies the loading target element among the elements of the input matrix 910 based on the position of the partial matrix 911 in the input matrix 910 and the position shown by the row and column for each row of the element list. The memory management unit 193 loads the value of the element identified by the computation execution unit 192. As described above, in the element list, only positions where there are one or more elements having a value other than "0" are stated. Accordingly, the memory management unit 193 suppresses loading of, among the elements of the input matrix 910, elements where values of the computation subject elements for the elements are all "0".

Loading of, among the elements of the input matrix 910, elements where values of the computation subject elements for the elements are all "0" is suppressed. In this regard, according to the computation device 100, the number of memory accesses can be reduced.

The memory storage unit 180 is configured according to a plurality of hierarchical layers. The memory management unit 193 of the computation device 100 holds the output matrix 930 in the cache memory unit 181, which is a hierarchical layer at a speed higher than that of the main memory storage unit 182 among the memory storage hierarchical layers of the memory storage unit 180, until at least the computation for one partial matrix 911 starts and ends.

As a result, the memory management unit 193 can reduce the memory access time taken when the results computed by the computation execution unit 192 are reflected in the output matrix 930.

The computation device 100 may perform the processing for several partial matrices 911 by loading the element values from the input matrix 910 once, that is, by parallelly executing convolution of each of the plurality of partial matrices 911 and the kernel 920. This point will be described with reference to FIG. 11.

Figure 11:
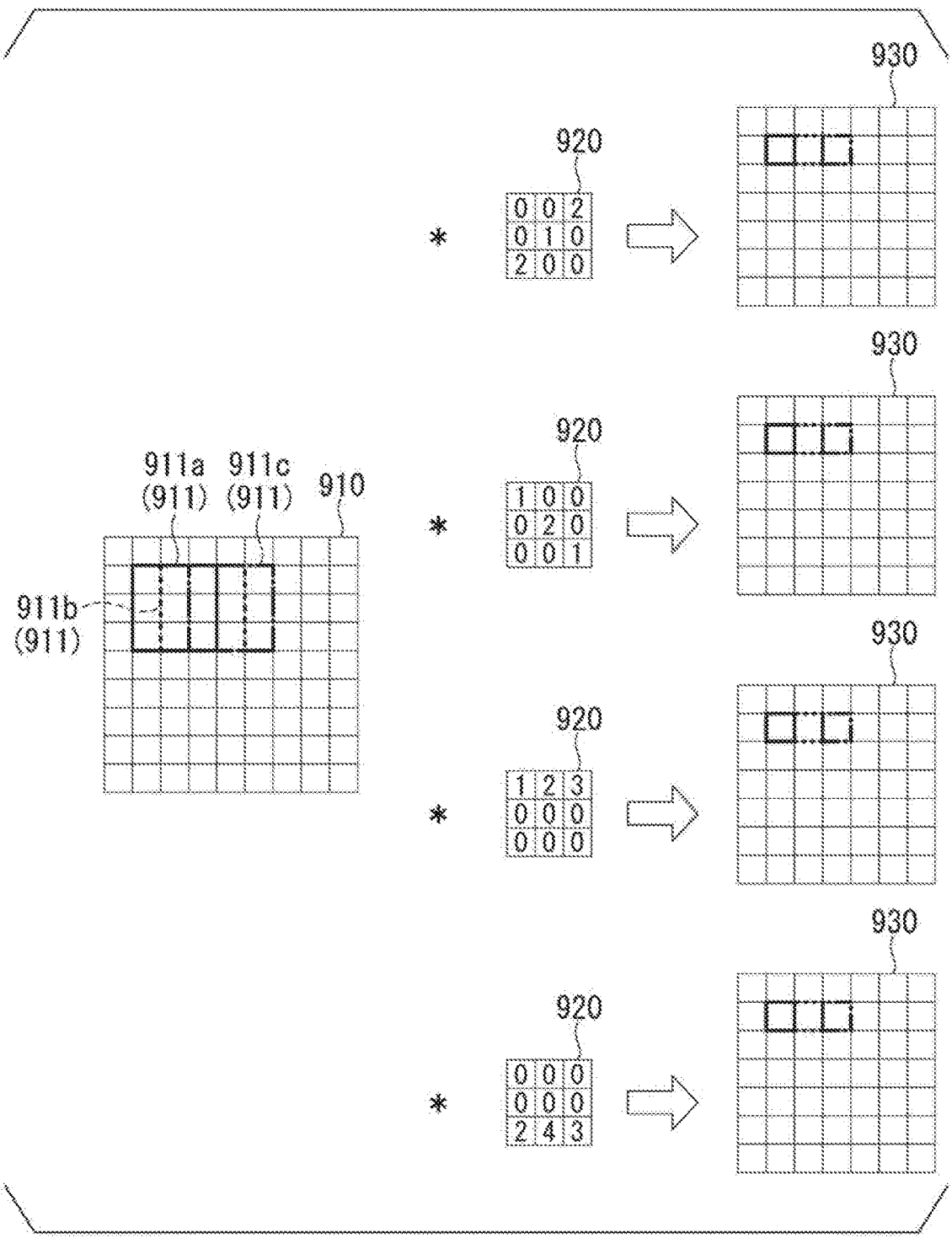
FIG. 11 is a diagram showing an arrangement example of a plurality of partial matrices when the computation device according to the exemplary embodiment performs processing on the plurality of partial matrices with one loading of element values from the input matrix.

FIG. 11 is a diagram showing an arrangement example of a plurality of partial matrices 911 when the computation device 100 performs processing on the plurality of partial matrices 911 with one loading of element values from the input matrix 910. In FIG. 11, three partial matrices 911 are shown and are denoted by reference numerals 911a, 911b, and 911c to be differentiated from each other. The partial matrices 911a, 911b, and 911c are arranged in this order, each shifted by one column from the left side of the figure.

Each element in the rightmost column of the partial matrix 911a is also included in any of these three partial matrices 911. These elements are positioned in the middle column in the partial matrix 911b and in the leftmost column in the partial matrix 911c.

When the memory management unit 193 loads the element value common to the plurality of partial matrices 911 in this way, the computation execution unit 192 performs calculation for each of the plurality of partial matrices 911 using the loaded value.

For example, when the memory management unit 193 loads the element value of the 0-th row and the second column (the uppermost row and the rightmost column) of the partial matrix 911a, the computation execution unit 192 multiplies the loaded element value by the element value in the 0-th row and the second column of each kernel 920. The computation execution unit 192 adds the obtained product to the value of the corresponding element of the output matrix 930.

The element value loaded by the memory management unit 193 corresponds to the element value of the 0-th row and the first column (the uppermost row and the middle column) in the partial matrix 911b. Here, the computation execution unit 192 multiplies this element value by the element value of the 0-th row and the first column of each kernel 920, and adds the obtained product to the value of the corresponding element of the output matrix 930.

The element value loaded by the memory management unit 193 corresponds to the element value of the 0-th row and the 0-th column (the uppermost row and the leftmost column) in the partial matrix 911c. Here, the computation execution unit 192 multiplies this element value by the element value of the 0-th row and the 0-th column of each kernel 920, and adds the obtained product to the value of the corresponding element of the output matrix 930.

As described above, when the value of the element common to a plurality of partial matrices among the elements of the input matrix 910 is loaded, the computation execution unit 192 performs computation on each of the plurality of partial matrices 911 using the loaded value.

As a result, the computation device 100 can reduce the number of memory accesses.

Next, an example of a hardware configuration for configuring the computation device 100 will be described with reference to FIG. 12.

Figure 12:
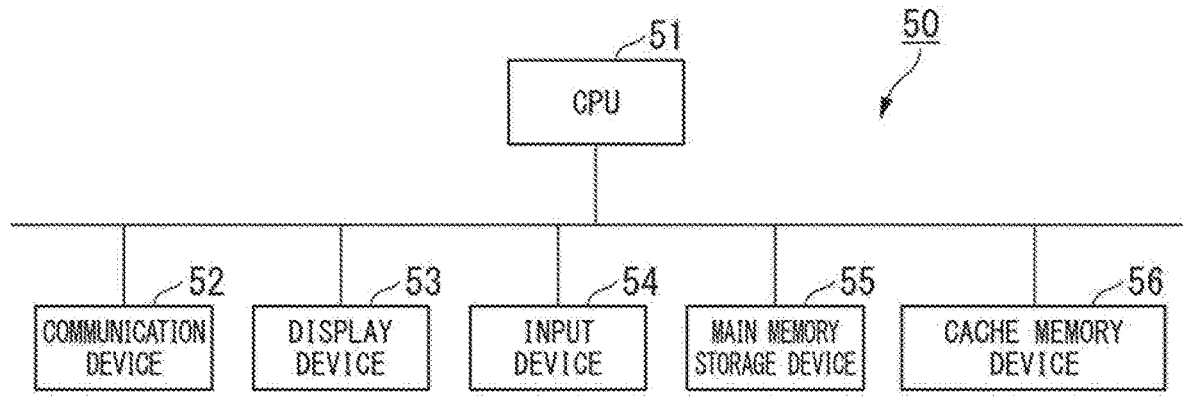
FIG. 12 is a schematic block diagram showing a configuration example of a computer according to the exemplary embodiment.

FIG. 12 is a schematic block diagram showing a configuration example of a computer according to the exemplary embodiment. The computer 50 shown in FIG. 12 includes a CPU 51, a communication device 52, a display device 53, an input device 54, a main memory storage device 55, and a cache memory device 56. The communication device 52 communicates with other devices. The display device 53 displays various images. The input device 54 receives a user operation. The main memory storage device 55 stores various types of information. The cache memory device 56 is a memory storage device which is faster than the main memory storage device 55 provided to reduce the memory access time for the CPU and so forth to access the main memory storage device 55, and temporarily stores information expected to be used by the CPU and so forth. The CPU 51 reads out and executes a program from one or both of the main memory storage device 55 and the cache memory device 56, thereby controlling each unit of the computer 50 and executing various processes.

The main memory storage unit 182 is equipped in the main memory storage device 55. The cache memory unit 181 is equipped in the cache memory device 56. The operation of the control unit 190 is stored in the form of a program in one or both of the main memory storage device 55 and the cache memory device 56. The CPU 51 reads the program from one or both of the main memory storage device 55 and the cache memory device 56, and executes the processing of the control unit 190 according to this program. The communication unit 110 is equipped in the communication device 52. The display unit 120 is equipped in the display device 53. The operation input unit 130 is equipped in the input device 54.

Next, a minimum configuration of the present invention will be described with reference to FIG. 13 and FIG. 14.

Figure 13:
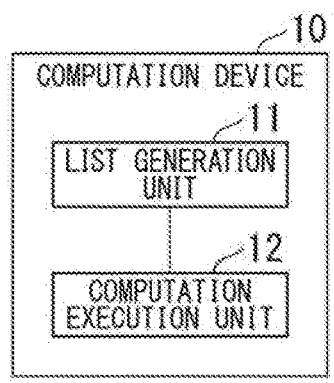
FIG. 13 is a diagram showing a first example of a minimum configuration of a computation device according to an exemplary embodiment.

FIG. 13 is a diagram showing a first example of a minimum configuration of a computation device according to the present invention. The computation device 10 shown in FIG. 13 includes a list generation unit 11 and a computation execution unit 12.

With such a configuration, the list generation unit 11 generates a list which shows element values of elements comprised in a plurality of computational matrices having equal numbers of rows and columns (first elements), the element values being indicated for the respective positions of the elements in the computational matrices. The computation execution unit 12 performs computation based on the element values of the elements indicated in the list (first elements) and the element values of elements comprised in a partial matrix belonging to a computation target matrix and having the same number of rows and columns as the computational matrices (second elements).

By performing computation using the list which shows the element value for each element position of the plurality of computational matrices, the computation execution unit 12 can perform multiplication of the elements of the partial matrix of the computation target matrix and each element of the plurality of computational matrices. As a result, in the computation device 10, computation with the elements of the plurality of computational matrices can be performed with a single loading of the element values of the partial matrix, and the number of downloads of the element values of the partial matrix can be reduced.

Figure 14:
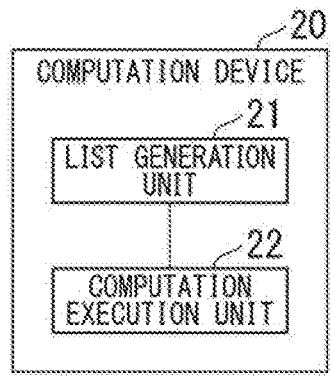
FIG. 14 is a diagram showing a second example of a minimum configuration of a computation device according to an exemplary embodiment.

FIG. 14 is a diagram showing a second example of a minimum configuration of a computation device according to the present invention. The computation device 20 shown in FIG. 14 includes a list generation unit 21 and a computation execution unit 22.

With such a configuration, the list generation unit 21 generates a list which shows element values of elements having values other than "0" and comprised in a plurality of computational matrices having equal numbers of rows and columns (first elements), the element values being indicated for the respective positions of the elements in the computational matrices.

The computation execution unit 22 performs computation based on the elements indicated in the list and the element values of elements (second elements) comprised in a partial matrix belonging to the computation target matrix and having the same number of rows and columns as the computational matrices.

The computation execution unit 22 performs computation using the element list showing elements other than ones where the element value is "0", for each element position of the plurality of computational matrices. As a result, it is possible to suppress multiplication to be performed between the elements of the partial matrix of the computation target matrix and the elements of the computational matrix when the element value of the computational matrix is "0", and to suppress accesses made in order to reflect the results of the multiplication in the data in the memory storage region. In this respect, the number of computations and the number of memory accesses can be reduced.

A program for realizing all or part of the control unit 190 may be recorded on a computer-readable recording medium, and the program recorded on the recording medium may be read into and executed on a computer system, to thereby perform the processing of each unit. The "computer system" here includes an operating system and hardware such as peripheral devices.

Moreover, the "computer-readable recording medium" here refers to a portable medium such as a flexible disk, a magnetic optical disk, a ROM, and a CD-ROM, or a memory storage device such as a hard disk built in a computer system. The above program may be a program for realizing a part of the functions described above, and may be a program capable of realizing the functions described above in combination with a program already recorded in a computer system.

The exemplary embodiment of the present invention has been described in detail with reference to the drawings. However, the specific configuration of the invention is not limited to this exemplary embodiment, and may include designs and so forth that do not depart from the scope of the present invention.

Priority is claimed on Japanese Patent Application No. 2017-122481, filed Jun. 22, 2017, the contents of which are incorporated herein by reference.

INDUSTRIAL APPLICABILITY

According to the present invention, it is possible to reduce the number of memory accesses in a matrix computation such as a two-dimensional convolution matrix computation.

REFERENCE SIGNS LIST 10, 20, 100 Computation device
11, 21, 191 List generation unit
12, 22, 192 Computation execution unit
110 Communication unit
120 Display unit
130 Operation input unit
180 Memory storage unit
181 Cache memory unit
182 Main memory storage unit
190 Control unit
193 Memory management unit

What is claimed is:
1. A computation device comprising:
at least one memory configured to store a program; and
at least one processor configured to execute the program to:
generate a list indicating a plurality of combinations of identification information for identifying a plurality of computational matrices and element values of first elements included in the plurality of computational matrices having equal numbers of rows and columns, the plurality of combinations of the identification information and the element values of the first elements being indicated for respective positions of the first elements in the plurality of computational matrices, and store the list that is generated into the at least one memory; and
carry out computation based on the element values of the first elements indicated in the list and element values of second elements included in a partial matrix belonging to a computation target matrix and having a same number of rows and columns as the plurality of computational matrices,
wherein the at least one processor is configured to execute the program to:
generate the list indicating the plurality of combinations of the identification information and the element values of the first elements, in which a combination where the element value of a given first element of the first elements is zero is excluded, for the respective positions in which a given position where the element values of the first elements for all of the plurality of computational matrices are zero is excluded; and
reference, when carrying out of the computation, the list indicating the plurality of combinations of the identification information and the element values of the first elements according to the respective positions, load the element values of the second elements where at least one of the plurality of computational matrices which are subject to the computation includes a non-zero first element, among the second elements of the computation target matrix, and suppress loading of the element values of the second elements where none of the plurality of computational matrices which are subject to the computation include the non-zero first element,
wherein the at least one memory is configured to have a first hierarchical layer indicating a main memory storage device and a second hierarchical layer faster than the first hierarchical layer, and
a matrix which stores a computation result is held in the second hierarchical layer from start to end of the computation performed on at least one of the partial matrix.
2. The computation device according to claim 1, wherein the at least one processor is configured to execute the program to:
carry out the computation based on the element values of the first elements and the element values of the second elements included in the partial matrix, while shifting a position of a region for the partial matrix in the computation target matrix; and
use, when the element values of the second elements common to a plurality of partial matrices with different positions of the region among the second elements included in the computation target matrix are loaded, the loaded element values to perform each computation on the plurality of partial matrices.
3. A computation method comprising:
generating a list indicating a plurality of combinations of identification information for identifying a plurality of computational matrices and element values of first elements included in the plurality of computational matrices having equal numbers of rows and columns, the plurality of combinations of the identification information and the element values of the first elements being indicated for respective positions of the first elements in the plurality of computational matrices, and storing the list that is generated into a memory having a first hierarchical layer indicating a main memory storage device and a second hierarchical layer faster than the first hierarchical layer; and carrying out computation based on the element values of the first elements indicated in the list and element values of second elements included in a partial matrix belonging to a computation target matrix and having a same number of rows and columns as the plurality of computational matrices, wherein the generating the list includes generating the list indicating the plurality of combinations of the identification information and the element values of the first elements, in which a combination where the element value of a given first element is zero is excluded, for the respective positions in which a given position where the element values of the first elements for all of the plurality of computational matrices are zero is excluded, the carrying out of the computation includes referencing, when carrying out of the computation, the list indicating the plurality of combinations of the identification information and the element values of the first elements according to the respective positions, loading the element values of the second elements where at least one of the plurality of computational matrices which are subject to the computation includes a non-zero first element, among the second elements of the computation target matrix, and suppressing loading of the element values of the second elements where none of the plurality of computational matrices which are the subjects to the computation include the non-zero first element, and a matrix which stores a computation result is held in the second hierarchical layer from start to end of the computation performed on at least one of the partial matrix.

* * * * *